United States Patent
Lazraq et al.

(10) Patent No.: US 6,330,435 B1
(45) Date of Patent: Dec. 11, 2001

(54) DATA PACKET DISCARD NOTIFICATION

(75) Inventors: Tawfik Lazraq, Lidingö; Farooq Khan, Kista, both of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/271,319

(22) Filed: Mar. 18, 1999

(51) Int. Cl.[7] .................................................. H04B 1/06
(52) U.S. Cl. ........................ 455/412; 455/466; 370/229
(58) Field of Search .................................. 455/412, 403, 455/575, 466; 370/229, 230, 235, 237, 236, 356, 365; 340/7.52, 7.3

(56) References Cited

U.S. PATENT DOCUMENTS

| | | | |
|---|---|---|---|
| 5,282,203 | * 1/1994 | Oouchi ................................. | 370/60 |
| 5,311,509 | * 5/1994 | Heddes et al. ........................ | 370/60 |
| 5,628,051 | * 5/1997 | Salin ................................... | 455/33.1 |
| 5,655,219 | * 8/1997 | Jusa et al. ............................ | 370/338 |
| 5,684,791 |   11/1997 | Raychaudhuri et al. | |
| 5,701,312 | * 12/1997 | DeLuca et al. ....................... | 371/32 |
| 5,729,530 | * 3/1998 | Kawaguchi et al. ................. | 370/236 |
| 5,844,918 | * 12/1998 | Kato ..................................... | 371/35 |
| 5,870,548 | * 2/1999 | Nielsen ............................ | 395/200.36 |
| 5,999,528 | * 12/1999 | Chow et al. ......................... | 370/365 |
| 6,047,272 | * 4/2000 | Biliris et al. ......................... | 705/400 |
| 6,058,290 | * 5/2000 | Katagiri .............................. | 455/38.4 |
| 6,078,568 | * 6/2000 | Wright et al. ........................ | 370/312 |
| 6,144,636 | * 12/2000 | Aimoto et al. ....................... | 370/229 |
| 6,163,861 | * 12/2000 | Yoshioka ............................. | 714/712 |

OTHER PUBLICATIONS

IEEE Transactions on Communications, Nachum Shacham, Senior Member, IEEE and Byung Cheol Shin, "A Selective–Repeat–ARQ Protocol for Parallel Channels and Its Resequencing Analysis", Apr. 1992, pp. 773–782.
European Standard Search Report dated Nov. 22, 1999.

* cited by examiner

*Primary Examiner*—William Trost
*Assistant Examiner*—Congvan Tran
(74) *Attorney, Agent, or Firm*—Burns, Doane, Swecker & Mathis, L.L.P.

(57) ABSTRACT

An algorithm complementary to the Selective Repeat ARQ technique is provided, that allows obsolete or otherwise superfluous packets to be safely discarded at the transmitter when using the Selective Repeat ARQ technique. Thus, clogging of ARQ buffers and deadlocking of the system can be avoided, and data transfer in mobile wireless environments using Selective Repeat ARQ can be made more efficient. In accordance with various embodiments of the algorithm, a data packet discard notification (DPDN) message is sent by the transmitter to the receiver to indicate to the receiver which packets the transmitter has discarded, so that the receiver need no longer expect to receive them. The DPDN message can be sent when the transmitter discards packets. The DPDN message can also be sent in response to a communication such as a request or negative acknowledgment that is sent by the receiver to the transmitter.

13 Claims, 5 Drawing Sheets

DATA PACKET DISCARD NOTIFICATION

FIELD OF THE INVENTION

The present invention relates generally to information transfer in mobile wireless environments, and in particular to management of unacknowledged data frames in Selective Repeat ARQ.

BACKGROUND OF THE INVENTION

In wireless mobile environments, shadowing and multipath fading result in significant cell loss ratio performance degradation. Automatic repeat request (ARQ) and forward error correction (FEC) are frequently used to improve bit error rate (BER) performance. When the communication channel is of poor quality, some messages (e.g., words, cells, etc.) sent by a transmitter to a receiver that are negatively acknowledged (NACKed) or remain unacknowledged by the receiver after a predetermined amount of time after being transmitted (i.e., have timed out), should be stored in ARQ buffers in the transmitter, until they can be successfully transmitted from the transmitter to the receiver or until a period of time expires. A NACK or a timing out can operate as a request from the receiver to the transmitter to retransmit the corresponding message.

In accordance with the well-known Selective Repeat ARQ protocol, when a receiver recognizes that it has not correctly received a particular message, the receiver stores all correctly received messages subsequent to the incorrectly received message in a buffer.

For some messages, after the transmitter has attempted a number of times to retransmit a particular message without success, or after a period of time expires, the message should be discarded from the transmitter's ARQ buffer. However, if the receiver continues to expect discarded messages, the system can go into deadlock.

SUMMARY OF THE INVENTION

In accordance with various embodiments of the invention, an algorithm complementary to the Selective Repeat ARQ technique is provided, that allows obsolete or otherwise superfluous packets to be safely discarded at the transmitter when using the Selective Repeat ARQ technique. Thus, clogging of ARQ buffers and deadlocking of the system can be avoided, and data transfer in mobile wireless environments using Selective Repeat ARQ can be made more efficient. In accordance with various embodiments of the algorithm, a cell discard notification (CDN) message is sent by the transmitter to the receiver to indicate to the receiver which cells or packets the transmitter has discarded, and which the receiver need no longer expect to receive.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

DETAILED DESCRIPTION OF THE INVENTION

In accordance with exemplary embodiments of the invention, when some messages, or cells, should be discarded from the ARQ buffer in the transmitter, the transmitter sends a cell discard notification message (CDN message) to the receiver so that the receiver will not continue to expect to receive the discarded messages.

Upon reception of a CDN message, the receiver computes which cells have been discarded in the transmitter using information provided by the CDN message, and alters its expectations of which cells to receive. For example, where the receiver maintains a list of incorrectly received cells, or cells that are expected and have not yet been correctly received, cells indicated as discarded by the CDN message can be deleted from the receiver's list.

In situations where a CDN message sent by the transmitter to the receiver is lost, the receiver will continue to ask for and expect incorrectly received cells. In this situation, the transmitter can resend the CDN message to the transmitter. In accordance with an exemplary embodiment of the invention, the transmitter can send an updated CDN message to include cells that it discarded after sending the previous CDN message.

Figure 1:
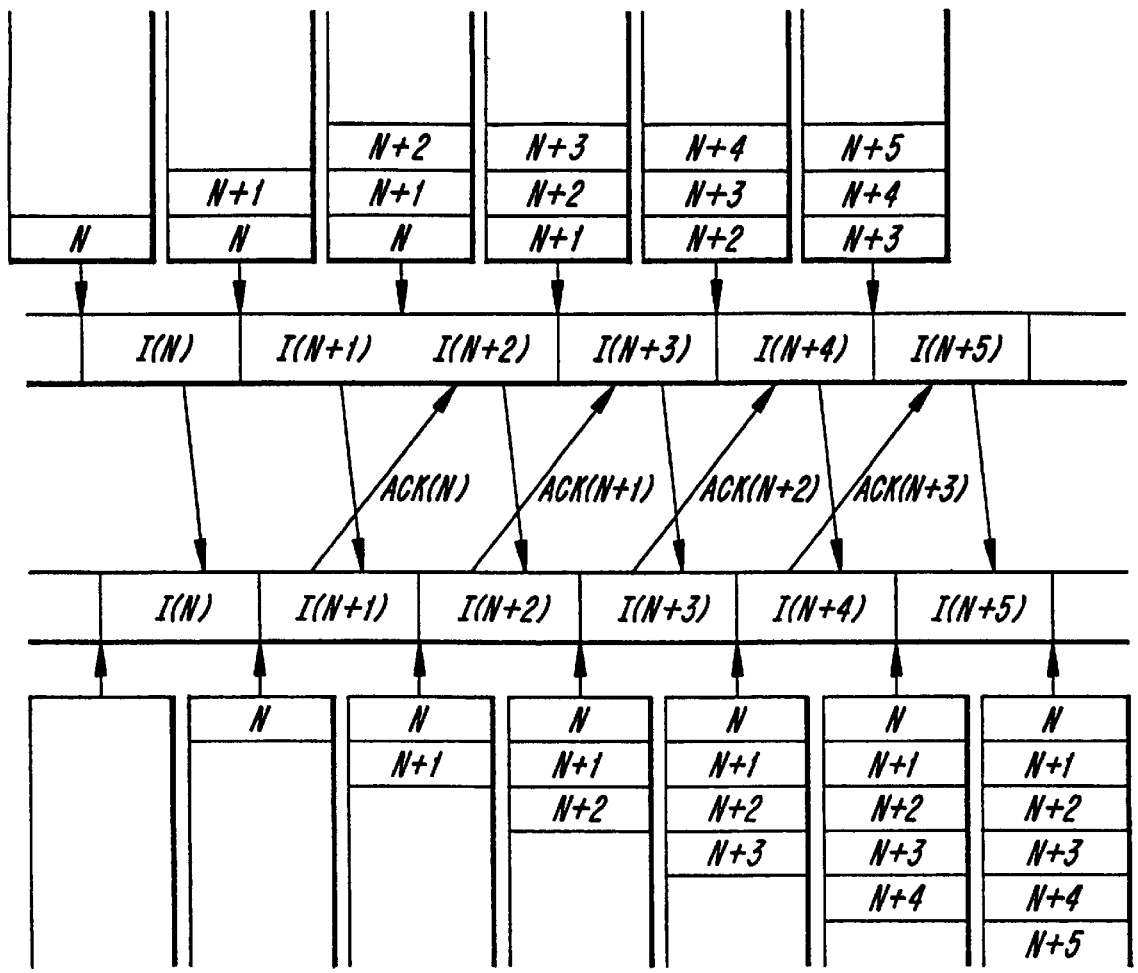
FIG. 1 shows an example of a Selective Repeat ARQ mechanism.
Figure 2:
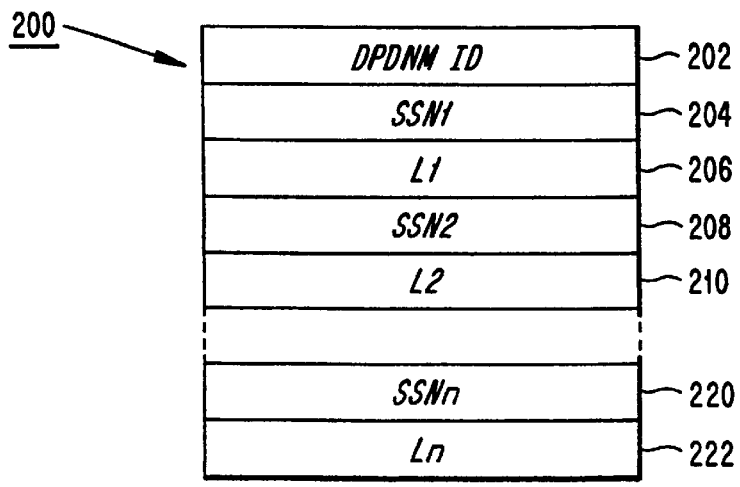
FIG. 2 shows an exemplary format of a cell discard notification message in accordance with an exemplary embodiment of the invention.

FIG. 2 shows an exemplary format of a CDN message in accordance with an exemplary embodiment of the invention. The CDN message 200 optionally includes a CDN message identification field CDNM ID, which can indicate that the message is a CDN message, and which can indicate the type or format of the CDN message 200. The sequence number field 204 contains a first sequence number SSN1 which identifies a particular cell to be discarded. The length field 206 contains a length L1, which indicates how many cells immediately subsequent to the SSN1 cell should also be discarded. The CDN message 200 can contain a plurality of such field pairs, for example the sequence number fields 208 to 220 containing the sequence numbers SSN2 to SSNn, as well as the corresponding length fields 210 to 222 containing the lengths L2 to Ln.

Figure 3:
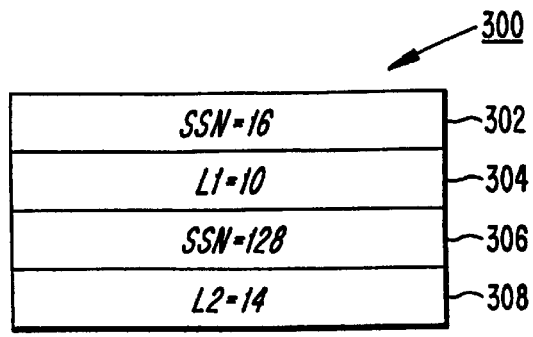
FIG. 3 shows a specific example of a cell discard notification message in accordance with the format shown in FIG. 2.

FIG. 3 shows a specific example of a CDN message 300, where a sequence number field 302 indicates a cell having a sequence number SSN=16, and a sequence number field 306 indicates a cell having a sequence number SSN=128. The corresponding length fields 304 and 308, indicate lengths of L1=10 and L2=14, respectively. Thus, the CDN message 300 indicates that the transmitter has discarded cells 16–25 and 128–141. This CDN format can be used in situations where a large number of cells in a sequence are discarded, for example when a higher layer PDU (protocol data unit) such as an IP (Internet Protocol) packet is transmitted in multiple small linker layer cells and all the link level cells corresponding to a given IP packet are discarded.

Figure 4:
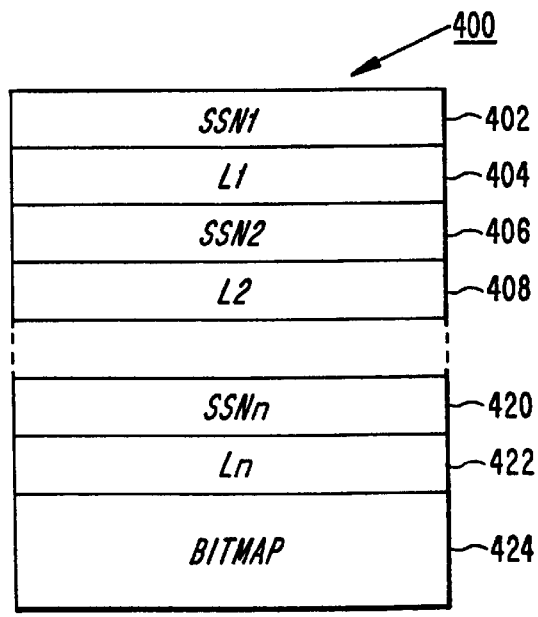
FIG. 4 shows another exemplary format of a cell discard notification message in accordance with an exemplary embodiment of the invention.
Figure 5:
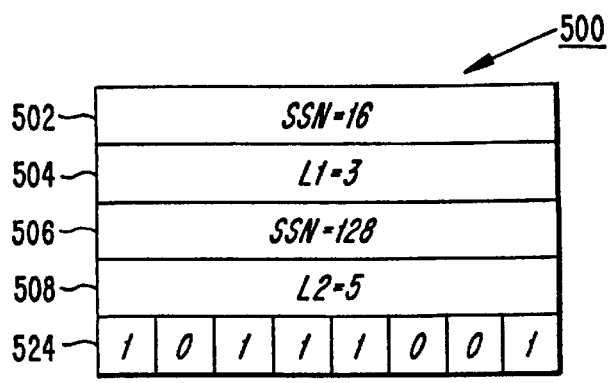
FIG. 5 shows a specific example of a cell discard notification message in accordance with the format shown in FIG. 4.

Alternatively, a bitmap representation of the discarded cells can be used, for example when the sequence numbers of cells to be discarded are not in sequence. FIG. 4 shows an exemplary format of a CDN message 400 containing a bitmap. The sequence number fields 402, 406, and 420 contain sequence numbers SSN1, SSN2, to SSNn identifying specific cells. The length fields 404, 408 and 422 contain lengths L1, L2 and Ln of the bitmap portion corresponding to cell sequences beginning with the cells identified in the sequence number fields 402, 406 and 420. Finally, the bitmap field 424 contains a bitmap indicating which cells in the cell sequences are discarded. FIG. 5 shows a specific example.

In FIG. 5, the first sequence number field 502 identifies the first cell as bearing sequence number SSN=16, and the corresponding length field 504 indicates a bitmap portion length of L1=3. Thus, the leftmost 3 bits of the bitmap in the bitmap field 424 indicate a "1" for cell 16, a "0" for cell 17, and a "1" for cell 18, indicating that cells 16 and 18 have been discarded by the transmitter. In a similar fashion, the sequence number field 506 identifying a next beginning cell as bearing sequence number SSN 32 128, and a corresponding length field 508 of L2=5. Thus, the right most 5 bits of the bitmap in the bitmap field 424 indicate, starting from the left, a "1" for cell 128, a "1" for cell 129, a "0" for cell 130, a "0" for cell 131, and a "1" for cell 132, indicating that cells 128, 129 and 132 have also been discarded.

Of course, those skilled in the art will recognize that the bitmap can begin with the least significant bit instead of the most significant bit, the sequence number fields can indicate ending cells instead beginning cells, and so forth.

Figure 6:
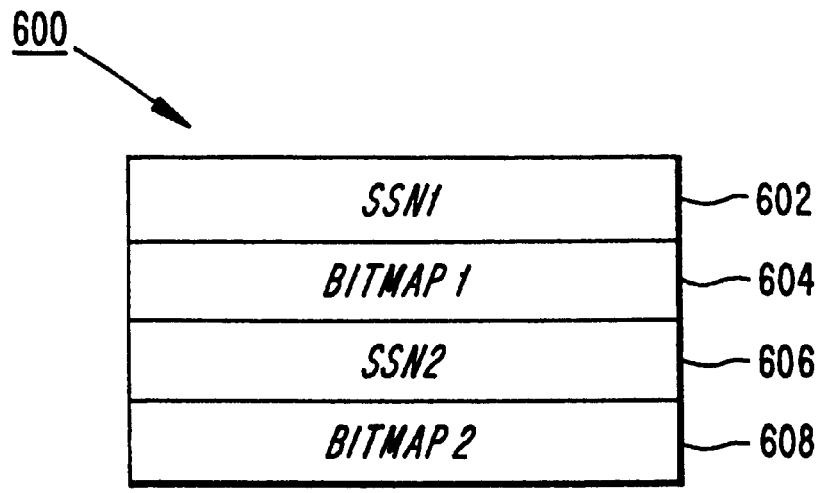
FIG. 6 shows another exemplary format of a cell discard notification message in accordance with an exemplary embodiment of the invention.

Alternatively, as shown in FIG. 6, a bitmap having a predetermined length can be provided instead of a length field for each beginning cell. For example, field 604 contains a bitmap for the cell sequence having a length corresponding the length of the bitmap and beginning with the cell bearing sequence number SSN1 as shown in the sequence number field 602. Although the CDN message 600 shown in FIG. 6 is only shown with two cell-bitmap pairs, the CDN message 600 can have any appropriate number of cell-bitmap pairs.

Furthermore, as an alternative, a CDN message can explicitly contain the sequence number for each discarded cell. For example, the CDN message can include a sequence number field for each discarded cell.

Figure 7:
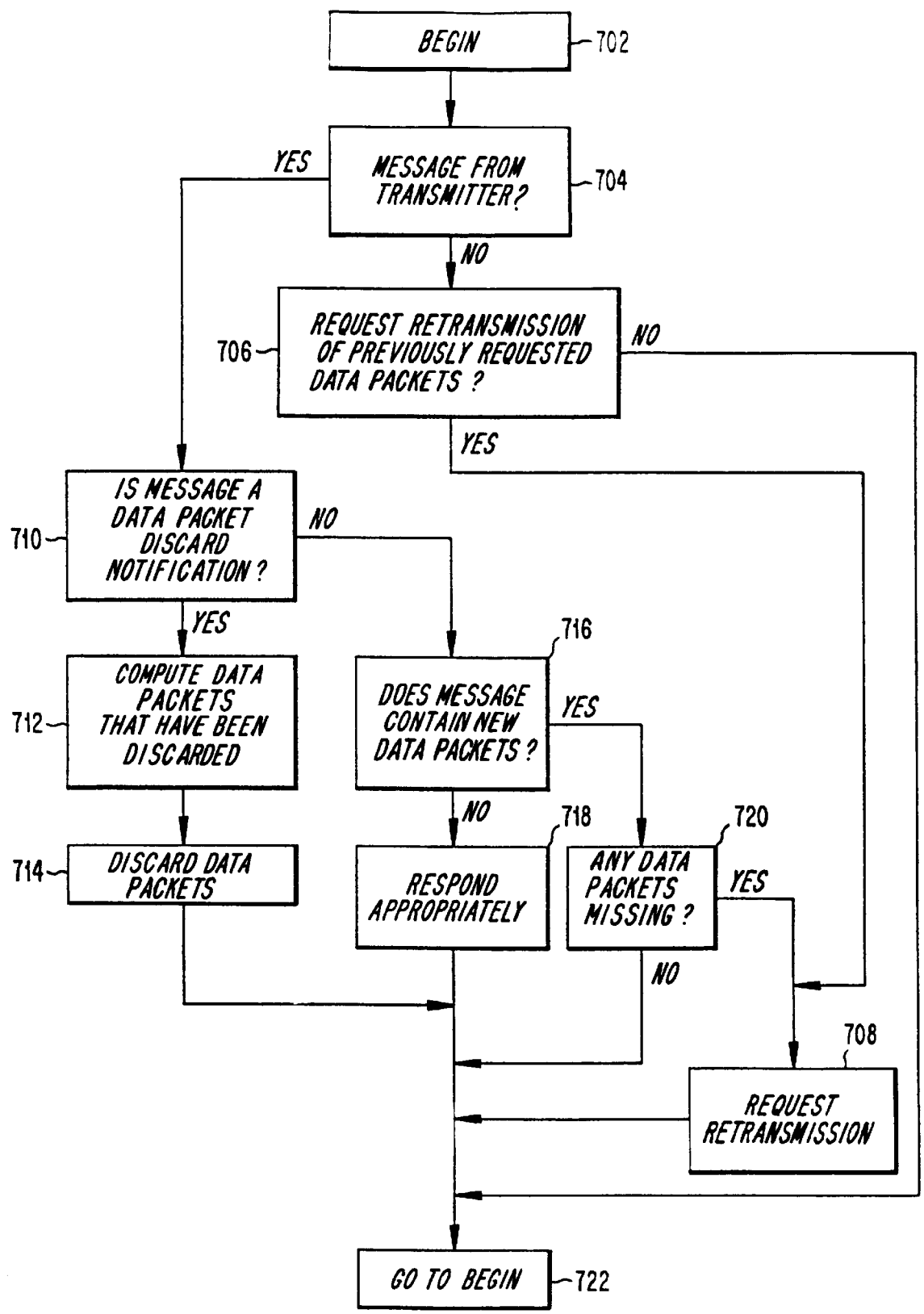
FIG. 7 shows a control flow at a receiver in accordance with an exemplary embodiment of the invention.

FIG. 7 shows an exemplary control flow at a receiver, in accordance with an exemplary embodiment of the invention. As shown in FIG. 7, after beginning in step 702, control flows to step 704, where the receiver determines whether it has received a message from the transmitter. If no, then control flows to step 706, where the receiver determines whether to request retransmission of cells it has previously requested the transmitter to retransmit, but which it has not yet received and which it believes have not been discarded. If yes, then control flows from step 706 to step 708, where the receiver sends a retransmission request to the transmitter in accordance with the Selective Repeat ARQ protocol. From step 708, control flows to step 722, which returns the control flow the begin step 702. If in step 706 the receiver elects not to send a retransmission request at that time, then control flows directly from step 706 to step 722.

If at step 704 the receiver determines that it has received a message from the transmitter, then control flows from step 704 to step 710 where the receiver determines whether the message is a CDN message. If yes, then control flows from step 710 to step 712, where the receiver computes which cells have been discarded based on the received CDN message. From step 712 control flows to step 714, where the receiver discards the cells discarded by the transmitter. For example, the receiver alters a list of cells it expects to receive to omit the cells discarded by the transmitter, as indicated by the CDN message. From step 714, control flows to step 722, which returns the control flow to the begin step 702.

If at step 710 the receiver determines that the message from the transmitter is not a CDN message, then control flows from step 710 to step 716 where the receiver determines whether the message contains new cells. If in step 716 the receiver determines that the message does not contain new cells, then control proceeds from step 716 to step 718 where the receiver responds appropriately. For example, where the message contains a retransmission and is correctly received, the receiver can respond by appropriately acknowledging the message and removing the correctly received, retransmitted cells from its list of expected cells, in accordance with the Selective Repeat ARQ protocol. From step 718 control flows to step 722, where control flow is returned to the begin step 702.

If in step 716 the receiver determines that the message contains new cells, then control flows from step 716 to step 720 where the receiver determines whether any new cells are incorrectly received or missing. If at step 720 any new cells are incorrectly received or missing, then control proceeds from step 720 to step 708, where the receiver appropriately requests retransmission of the incorrectly received or missing cells. From step 708, control flows to step 722, where control flow is returned to the begin step 702. If at step 720 the receiver determines that no cells in the message are incorrectly received or missing, then control flows directly from step 720 to step 722 where control flow is returned to the begin step 702.

Figure 8:
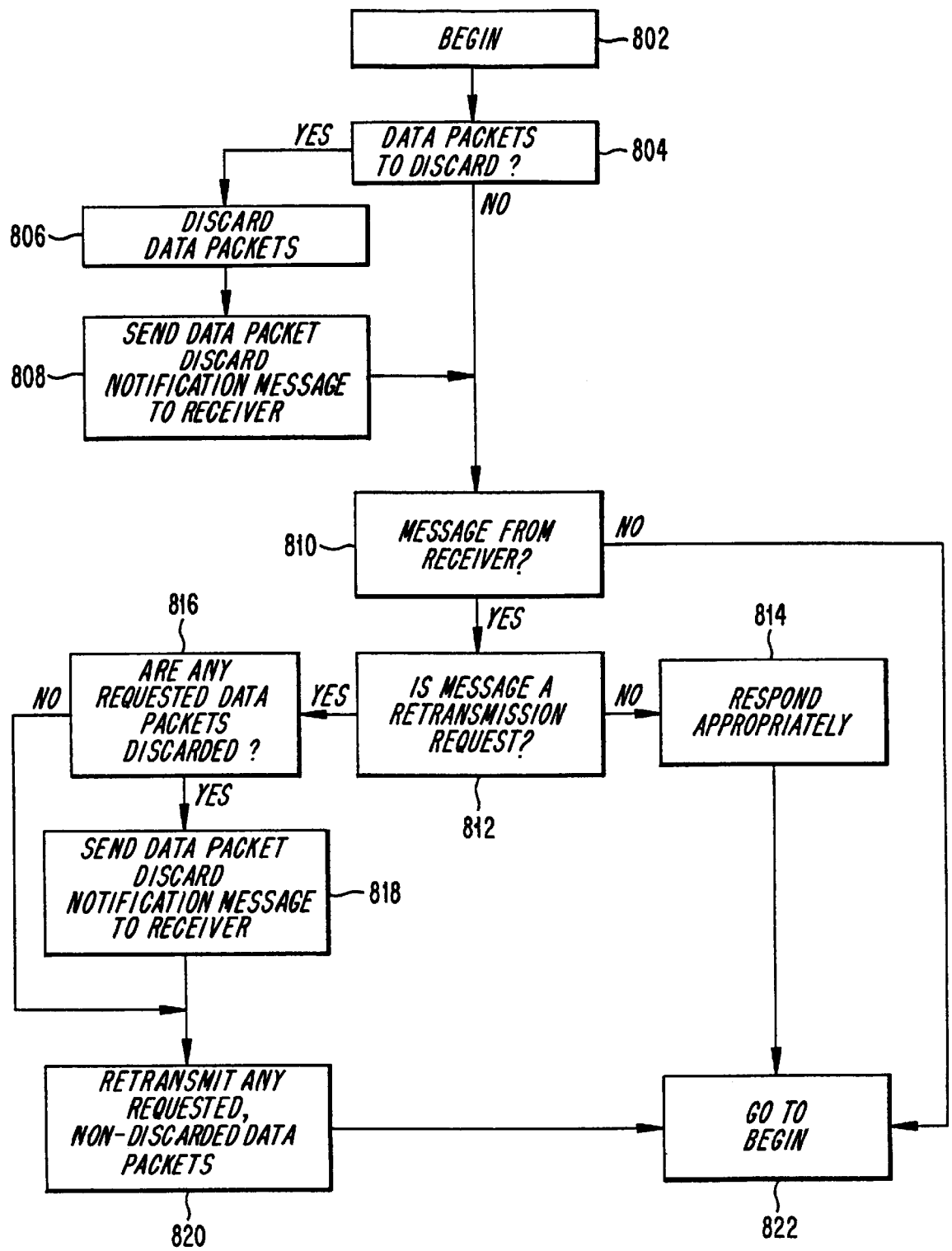
FIG. 8 shows a control flow at a transmitter in accordance with an exemplary embodiment of the invention.

FIG. 8 shows an exemplary control flow at a transmitter, in accordance with an exemplary embodiment of the invention. As shown in FIG. 8, after beginning in step 802, control flows to step 804, where the transmitter determines whether any cells should be discarded. If no, then control flows from step 804 to step 810, where the transmitter determines whether it has received a message from the receiver. If no, then control proceeds from step 810 to step 822, where control flow returns to the begin step 802.

If at step 810 the transmitter determines that it has received a message from the receiver, then control flows from step 810 to step 812 where the transmitter determines whether the message is a retransmission request. If no, the control flows from step 812 to step 814, where the transmitter responds appropriately in accordance with the Selective Repeat ARQ protocol, and then from step 814 to step 822 where control is returned to the begin step 802.

If at step 812 the transmitter determines that the message is a retransmission request, then control flows from step 812 to step 816, where the transmitter determines whether any of the cells requested by the receiver have been discarded. If no, then control proceeds from step 816 to step 820, where the transmitter retransmits any requested, non-discarded cells. from step 820 control flows to step 822, where control is returned to the begin step 802.

If at step 816 the transmitter determines that one or more of the cells requested by the receiver has been discarded, then control proceeds to step 818 where the transmitter sends a CDN message to the receiver, indicating that the cells have been discarded. From step 818 control flows to step 820, where any requested, non-discarded cells are retransmitted.

If at step 804 the transmitter determines that cells should be discarded, then control proceeds to step 806 where the transmitter discards the cells. From step 806 control flows to step 808, where the transmitter sends a CDN message to the receiver indicating that the cells have been discarded.

In situations where the transmitter sends a CDN message indicating cells discarded by the transmitter and the receiver did not expect to receive one or more of the indicated cells, in accordance with an exemplary embodiment of the invention the receiver can ignore the CDN message with respect to the cells the receiver did not expect to receive. This can be performed, for example, as part of steps 712 and 714 of FIG. 7, where the "non-expected" cells are computed in step 712, and then ignored in step 714. Then, if the receiver later comes to expect to receive one or more of the discarded cells, it can request a retransmission of them and the transmitter can reply by sending a CDN message to the receiver. Alternatively, the receiver can maintain a list of "non-expected" cells, in other words, a list of cells the receiver was not expecting to receive when it first learned via a CDN message that the transmitter had discarded them. The list can be updated, for example, as part of step 712. Later, when the receiver reviews or updates its list of expected cells, it can compare the "non-expected" list with the "expected" list and remove matching entries from the lists. This can take place, for example, in one or more of steps 712, 714 and 720.

Figure 9:
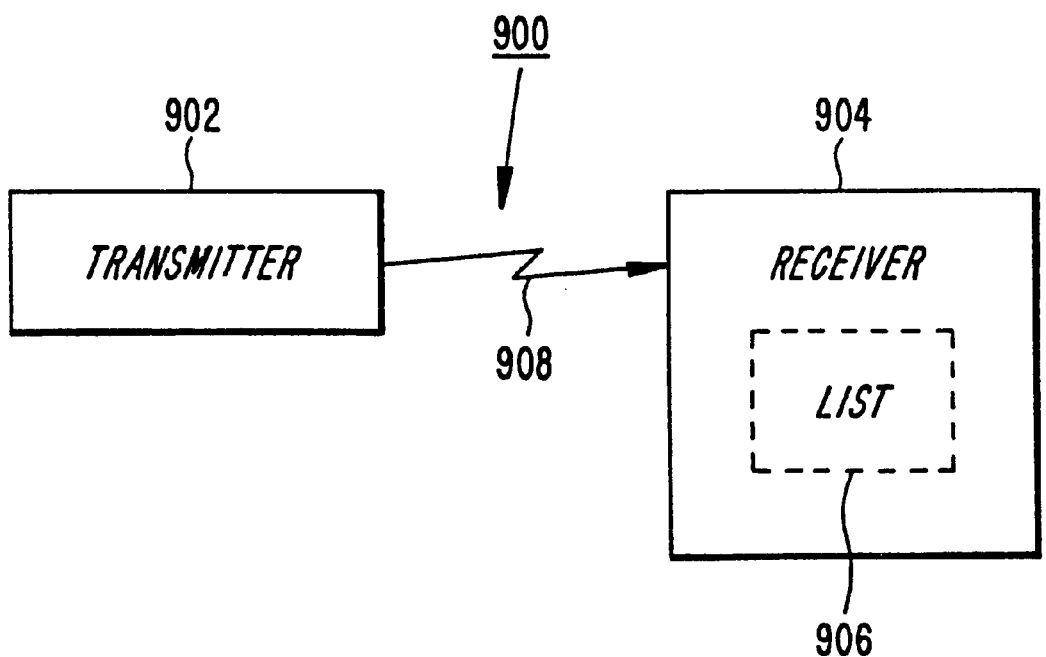
FIG. 9 is a block diagram of a system in accordance with an embodiment of the invention.

FIG. 9 is a block diagram of a system 900 in accordance with an embodiment of the invention, that is consistent with the methods described above with reference to, for example, FIGS. 7 and 8. The system 900 includes a transmitter 902 that sends information to a receiver 904 via a wireless link 908 in accordance with the methods described above with reference to, for example, FIGS. 7 and 8. The system 900 also includes a list 906 of sequence numbers representing cells expected by the receiver 904, which as shown in FIG. 9 can be implemented within the receiver 904. In accordance with an embodiment of the invention, the list 906 can also contain a listing of cells the receiver was not expecting to receive when it first learned via a CDN message that the transmitter had discarded them.

Another form of signaling that discarding has been done is described in copending U.S. application Ser. No. 09/179, 952, entitled Method and Apparatus for Discarding Packets In a Data Network Having Automatic Repeat Request, which is hereby incorporated by reference. A cell discard method for use with the PRIME-ARQ protocol is described in copending U.S. application Ser. No. 09/245,866, entitled PRIME-ARQ Flow Control Including Cell Discard, which is hereby incorporated by reference. Various aspects of the cell discard techniques described in copending U.S. application Ser. Nos. 09/179,952 and 09/245,866 can be appropriately combined with the cell discard techniques described further above.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for discarding data packets in a system having a transmitter and a receiver, wherein the method is complementary to the Selective Repeat Automatic Repeat Request protocol and comprises the steps of:

transmitting a data packet discard notification message from the transmitter to the receiver indicating data packets the transmitter has discarded;

receiving the data packet discard notification message;

computing which data packets have been discarded by the transmitter based on the data packet discard notification message;

removing entries from a first list indicating data packets expected to be received from the transmitter, wherein the entries correspond to data packets identified in the computing step.

2. The method of claim 1, wherein the data packet discard notification message contains a field indicating a format of the message.

3. The method of claim 1, wherein:

the data packet discard notification message includes at least one pair of a data packet sequence number field and a length field; and for each at least one pair, the data packet sequence number field indicates a first data packet to be discarded by the receiver and the length field indicates a number of data packets immediately preceding the first data packet, that are to be discarded by the receiver.

4. The method of claim 1, wherein:

the data packet discard notification message includes at least one pair of a data packet sequence number field and a length field; and for each at least one pair, the data packet sequence number field indicates a first data packet to be discarded by the receiver and the length field indicates a number of data packets nearest the first data packet, that are to be discarded by the receiver.

5. The method of claim 1, wherein:

the data packet discard notification message includes at least one pair of a data packet sequence number field and a length field; and for each at least one pair, the data packet sequence number field indicates a first data packet to be discarded by the receiver and the length field indicates a number of data packets immediately following the first data packet, that are to be discarded by the receiver.

6. The method of claim 1, wherein the data packet discard notification message includes a sequence number field for each data packet to be discarded by the receiver.

7. The method of claim 1, wherein the data packet discard notification message includes a bitmap and at least one pair of a data packet sequence number field and a length field, for each pair the length field designates a portion of the bitmap, the pair designates a group of data packets, and the portion of the bitmap indicates which of the group of data packets are to be discarded by the receiver.

8. The method of claim 7, wherein the data packets in the group are sequentially adjacent and the data packet sequence number field identifies a data packet at one end of the group.

9. The method of claim 7, wherein a sequence of the at least one pair together with the at least one length field indicates which portions of the bitmap correspond to different pairs of the at least one pair.

10. The method of claim 1, wherein the data packet discard notification message includes at least one pair of a data packet sequence number field and a bitmap, the data packet sequence number field and the bitmap together designate a group of data packets, and the bitmap indicates which of the group of data packets are to be discarded by the receiver.

11. The method of claim 1, further comprising the steps of:
- when the data packet discard notification message is not received by the receiver, updating the data packet discard notification message to include any data packets discarded by the transmitter after the data packet discard notification message was sent; and
- sending the updated data packet discard notification message to the receiver.

12. The method of claim 1, further comprising the steps of:
- transmitting a retransmission request from the receiver to the transmitter;
- receiving the retransmission request at the transmitter;
- determining whether any data packets indicated in the retransmission request have been discarded by the transmitter; and
- when data packets indicated in the retransmission request are determined to have been discarded by the transmitter, sending a data packet discard notification message from the transmitter to the receiver indicating that the data packets have been discarded by the transmitter.

13. The method of claim 1, further comprising the steps of:
- identifying any data packets indicated in the data packet discard notification message that do not have corresponding entries in the first list;
- adding entries to a second list indicating data packets expected not to be received from the transmitter, wherein the entries correspond to the data packets identified in the identifying step;
- periodically comparing the first and second lists to identify matching entries; and
- removing the identified matching entries from the first and second lists.

* * * * *